United States Patent
Sakamoto

[11] Patent Number: 6,091,590
[45] Date of Patent: *Jul. 18, 2000

[54] ELECTROMAGNETIC COIL ASSEMBLY FOR ELECTROMAGNETIC APPARATUS

[75] Inventor: Yuki Sakamoto, Isesaki, Japan

[73] Assignee: Sanden Corporation, Gunma, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/611,213

[22] Filed: Mar. 5, 1996

[30] Foreign Application Priority Data

Mar. 8, 1995 [JP] Japan .................................... 7-078279

[51] Int. Cl.[7] .............................. H02H 7/04; H01F 27/29
[52] U.S. Cl. ............................. 361/41; 336/192; 336/208
[58] Field of Search .................................... 336/192, 198, 336/208; 361/35, 37, 38, 39, 41, 833, 834

[56] References Cited

U.S. PATENT DOCUMENTS

| | | |
|---|---|---|
| 3,130,355 | 4/1964 | Younger . |
| 3,585,450 | 6/1971 | Lane ........................................ 336/192 |
| 4,181,393 | 1/1980 | Lill . |
| 4,404,534 | 9/1983 | Janvrin . |
| 4,419,536 | 12/1983 | Doyle et al. ............................. 336/192 |
| 4,429,358 | 1/1984 | Miyagi ..................................... 336/208 |
| 4,432,446 | 2/1984 | Okano et al. . |
| 4,503,413 | 3/1985 | Stalzer .................................... 336/192 |
| 4,557,544 | 12/1985 | Easer . |
| 4,623,754 | 11/1986 | Kikuchi et al. ......................... 336/208 |
| 4,771,198 | 9/1988 | Aschberger et al. . |
| 4,779,578 | 10/1988 | Matsushita . |
| 4,935,713 | 6/1990 | Bekheet . |
| 5,138,293 | 8/1992 | Ishimaru . |
| 5,225,801 | 7/1993 | Ida et al. . |
| 5,307,038 | 4/1994 | Ishimaru . |
| 5,320,206 | 6/1994 | Maejima . |
| 5,508,671 | 4/1996 | Takashi . |

FOREIGN PATENT DOCUMENTS

| | | |
|---|---|---|
| 0422962 | 4/1991 | European Pat. Off. . |
| 2726400 | 10/1995 | France . |
| 3816965 | 11/1989 | Germany . |
| 56-138529 | 10/1981 | Japan . |
| 2-106007 | 4/1990 | Japan ..................................... 336/198 |
| 2-2533014 | 10/1990 | Japan . |
| 2248969 | 4/1992 | Japan . |
| 8-247171 | 9/1996 | Japan . |
| 917200 | 1/1963 | United Kingdom . |
| 2234329 | 1/1991 | United Kingdom . |

*Primary Examiner*—Thomas J. Kozma
*Attorney, Agent, or Firm*—Baker Botts L.L.P.

[57] ABSTRACT

An electromagnetic coil assembly for an electromagnetic device comprises a bobbin, a multiple turn winding of electrical wire supported on a flange of the bobbin and a thermal protection device including a pair of lead wires extending from both sides thereof. The first lead wire is connected to one end of the multiple turn winding by a first joining member. The second lead wire is connected to an electric circuit by a second joining member. A connecting device, disposed on an outboard surface of one of the flanges of the bobbin, receives the thermal protection device, the first joining member and the second joining member.

2 Claims, 8 Drawing Sheets

ELECTROMAGNETIC COIL ASSEMBLY FOR ELECTROMAGNETIC APPARATUS

BACKGROUND OF THE INVENTION

1. Field of the Invention

This invention relates to an electromagnetic coil assembly, such as an electromagnetic clutch or brake for use in controlling the transmission of power from an automobile engine to a refrigerant compressor in an automobile air conditioning system, and more particularly, to the mounting structure for a thermal protection device in an electromagnetic apparatus.

2. Description of the Prior Art

An electromagnetic coil assembly with a thermal protection device is disclosed in JP 56-138529 to Teshima. In general, the electromagnetic clutch is provided with a thermal protection device, which is sensitive to abnormal temperature increases of the clutch. The thermal protection device shuts off the power source when abnormal frictional heat is generated due to slippage between the rotor and armature plate.

Referring to FIG. 1, an electromagnetic coil assembly comprises a bobbin 41 molded from plastic. Bobbin 41 includes a central tubular spool 41a and a pair of annular flanges 41b, 41c which project radially from the ends of spool 41a. A coil 44 is supported by bobbin 41 and is formed by multiple turns of electric wire 43 wound on spool 41a between flanges 41b, 41c. Thermal protection device 47, which has a pair of leads 45, 46 extending from both ends, is disposed on the outer surface of flange 41b. One end of lead 45 of thermal protection device 47 is secured to lead 50, which is connected to the power source (not shown), through caulking terminal 48. The other end of lead 46 of thermal protection device 47 is connected to electric wire 43 through caulking terminal 49.

In assembly, bobbin 41 is inserted into the inner portion of the housing, which has a U-shaped cross section, so that the outer end of flange 41b faces towards the opening in the housing. Thereafter, the cavity defined by bobbin 41, the housing and outer surface 41b are filled with a heated epoxy resin. As the resin hardens, coil 44 is fixed within the cavity.

Thermal protection device 47 is disposed adjacent to the open end of the cavity so that it is responsive to any increase in operating temperature. However, at the same time, thermal protection device 47 must be securely positioned against movement into the clutch rotor, since the clutch rotor is located adjacent the end surface 41b of bobbin 41. Thermal protection device 47 is secured to end surface 41b of bobbin 41 with electrical insulating tape 51, which is generally made of a resin, such a polyester resin or polyethylene terephthalate. Leads 45, 46 of thermal protection device 47 are made of electrically conductive material. Tape 51 insulates leads 45, 46 from clutch rotor.

Electrical insulating tape 51 generally has a smaller thermal conductivity than electrical epoxy resin. Consequently, when thermal protection device 47 is covered with electrical insulating tape 51 in addition to epoxy resin, the responsiveness of device 47 is reduced proportionately by the thermal conductivity of tape 51. In other words, excessive heat indicative of clutch failure will not reach thermal protection device 47 as quickly due to the presence of electrical insulating tape 51. Furthermore, in the assembly process, it is necessary to fixedly secure thermal protection device 47 on the end surface 41b of bobbin 41 with electrical insulating tape 51. The additional time needed to manipulate bobbin 41 and electrical insulating tape 51 so that thermal protection device 47 is properly positioned and secured is time consuming and reduces the efficiency of the assembly line.

These and other shortcomings of prior art electromagnetic coils are addressed by the electromagnetic coil of the preferred embodiments.

SUMMARY OF THE INVENTION

It is an object of the preferred embodiments to provide an electromagnetic coil assembly for an electromagnetic apparatus which is simple to manufacture.

It is another object of the preferred embodiments to provide an electromagnetic coil assembly for an electromagnetic apparatus with improved responsiveness to abnormal temperature increases of an electromagnetic apparatus.

According to the present invention, an electromagnetic coil assembly for an electromagnetic device comprises a bobbin including a cylindrical tubular spool and a pair of annular flanges radially projecting from the spool. A multiple turn winding of electrical wire is supported on the spool. A thermal protection device includes a pair of lead wires extending from both ends thereof. The first lead wire is connected to one end of the multiple turn winding by a first joining member. The second lead wire is connected to an electric circuit by a second joining member. A connecting device is disposed on an outboard surface of the flange of the bobbin. The connecting device, the thermal protection device, the first joining member and the second joining member are on the outboard surface of the flange of the bobbin.

Further objects, features and other aspects of this invention will be understood from the following detailed description of the preferred embodiments of this invention referring to the annexed drawings.

DETAILED DESCRIPTION OF THE PREFERRED EMBODIMENTS

Figure 1:
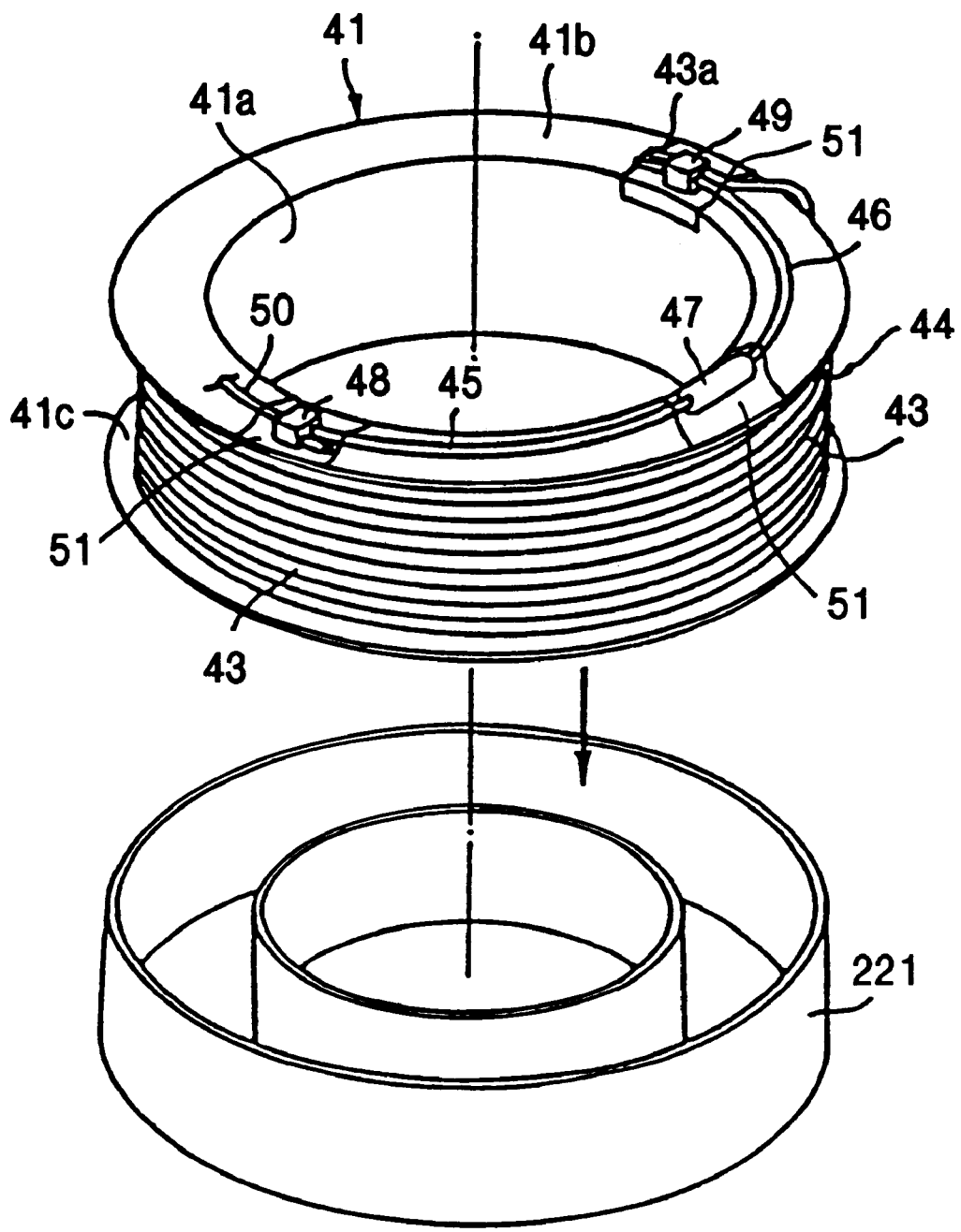
FIG. 1 is a perspective view of an electromagnetic coil assembly in accordance with the prior art.
Figure 2:
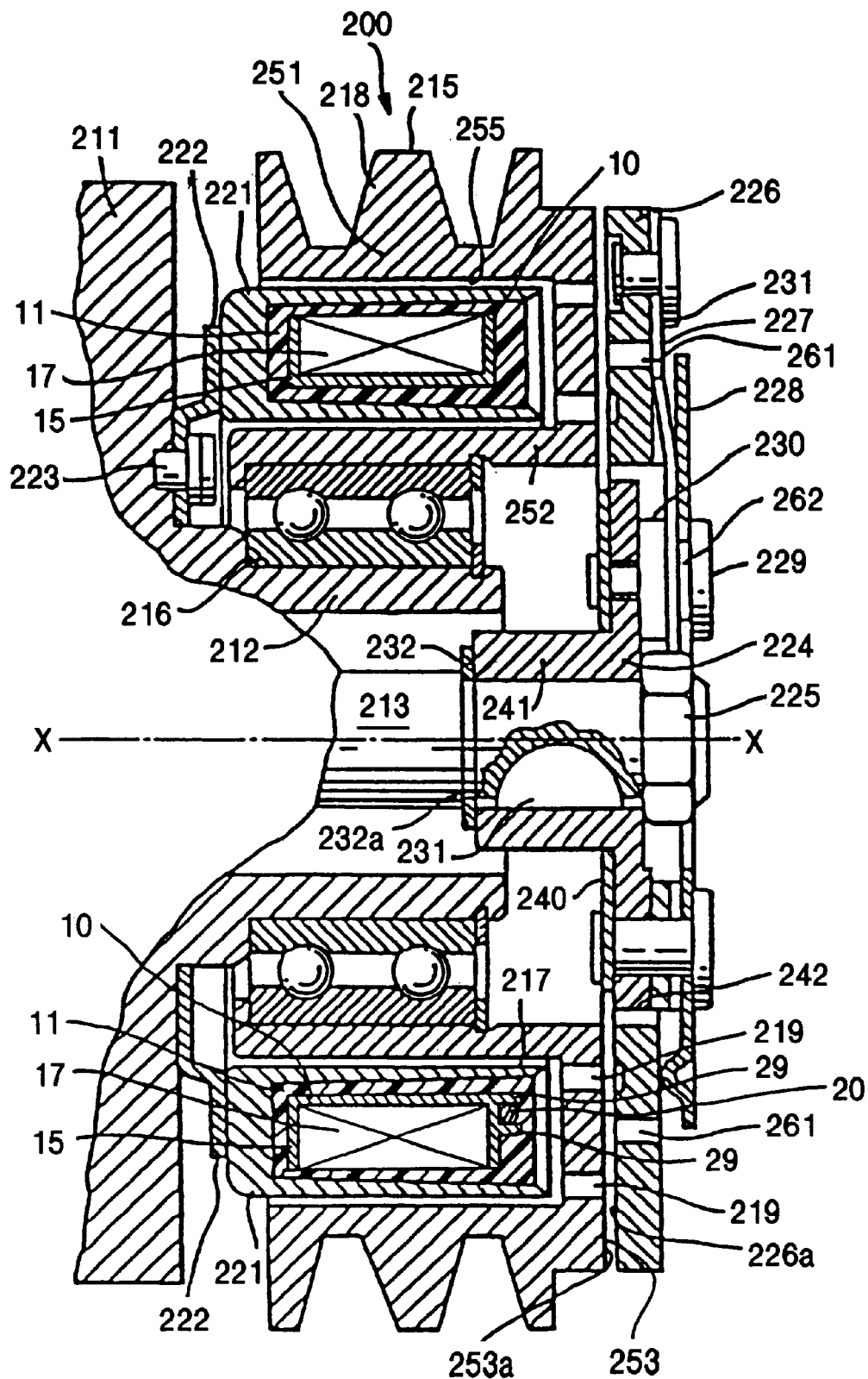
FIG. 2 is a cross sectional view of an electromagnetic clutch in accordance with a first preferred embodiment.

Referring to FIG. 2, an electromagnetic clutch assembly 200 according to a first preferred embodiment is shown. Clutch assembly 200 may be coupled to a refrigerant compressor in an automobile air conditioning system (not shown). For purposes of explanation only, the right side of FIG. 2 will be referred to as the forward or front end, while the left side of FIG. 2 will be referred to as the rearward or rear end.

A clutch rotor 215, an electromagnetic coil assembly 10, a housing 221 and a bearing 216 generally constitute a driving mechanism of the electromagnetic assembly. Hub 224, leaf spring 227, stopper plate 228 and annular armature plate 226 generally constitute the driven mechanism of electromagnetic clutch-assembly 200. Clutch assembly 200 is coupled with a tubular extension 212 surrounding a compressor drive shaft 213. Drive shaft 213 is rotatably supported within housing 211 along horizontal axis X—X by bearings (not shown). Hub 224, armature plate 226, and clutch rotor rotate about axis X—X.

Clutch rotor 215 is made of a magnetic material, such as steel, and comprises an outer annular cylindrical portion 251, an inner annular cylindrical portion 252, and an axial end plate portion 253 which connects the outer and inner portions 251 and 252 at their forward ends. Thus, an annular U-shaped cavity 255 is defined by portion 251, 252 and 253. A plurality of generally V-shaped grooves 218 are provided on the outer peripheral surface of outer annular cylindrical portion 251 for receiving belts (not shown) which couple rotor 215 to the automobile engine (not shown). Rotor 215 is rotatably supported on tubular extension 212 of compressor housing 211 by bearing 216, which surrounds the outer surface of tubular extension 212.

Axial end plate 253 includes one or more concentric slits 219, which are disposed on one or more concentric circles. Slits 219 define a plurality of annular or arcuate magnetic pieces with the surface of the poles on axial end plate 253.

Electromagnetic coil assembly 10 is disposed in annular cavity 255 of clutch rotor 215 to supply a magnetic flux for attracting armature plate 226 to axial end plate 253. Electromagnetic coil assembly 10 is contained within an annular electromagnetic housing 221. Housing 221 has a generally U-shaped cross section and is affixed, e.g., by welding, to a supporting plate 222, which is secured to the axial end surface of housing 211 by a plurality of rivets 223. A relativity small air gap is maintained between housing 221 and rotor 215.

Hub 224 comprises a tubular member 241, which is secured tightly on the terminal end portion of drive shaft 213, e.g., by forcible insertion. Flange portion 242 extends radially from the front end of tubular member 241 and may be integrally formed with tubular member 241, or formed separately and affixed by a known securing method, such as welding. Relative rotation between hub 224 and drive shaft 213 is prevented by a key-keyhole mechanism 231 provided at the terminal end portion of drive shaft 213. Hub 224 is further secured to drive shaft 213 by a nut 225 which is threaded on the terminal end portion of drive shaft 213.

Annular shim 232 is disposed between the rearward end of tubular member 241 of hub 224 and an annular ridge 232a. Ridge 232a is formed on the outer peripheral surface of the terminal end portion of drive shaft 213. The shim and ridge arrangement allow for the adjustment of the gap between annular armature plate 226 and axial end plate 253.

Armature plate 226 is made of a magnetic material, is concentric with hub 224, and has a frictional surface 226a which faces frictional surface 253a of axial end plate 253. Armature plate 226 has a plurality of elongated apertures 261 disposed on a concentric circle and is coupled to flange portion 242 of hub 224 through a plurality of leaf springs 227. Each leaf spring 227 is fixed at one end to armature plate 226 by a rivet 231 and at a second end to stopper plate 228. The second ends of leaf springs 227 are secured to spacing member 230 which are in turn secured to flange portion 242 by rivets 229. Accordingly, armature plate 226 may move relative to hub 224 along axis X—X upon the deflection of leaf springs 227.

Figure 3:
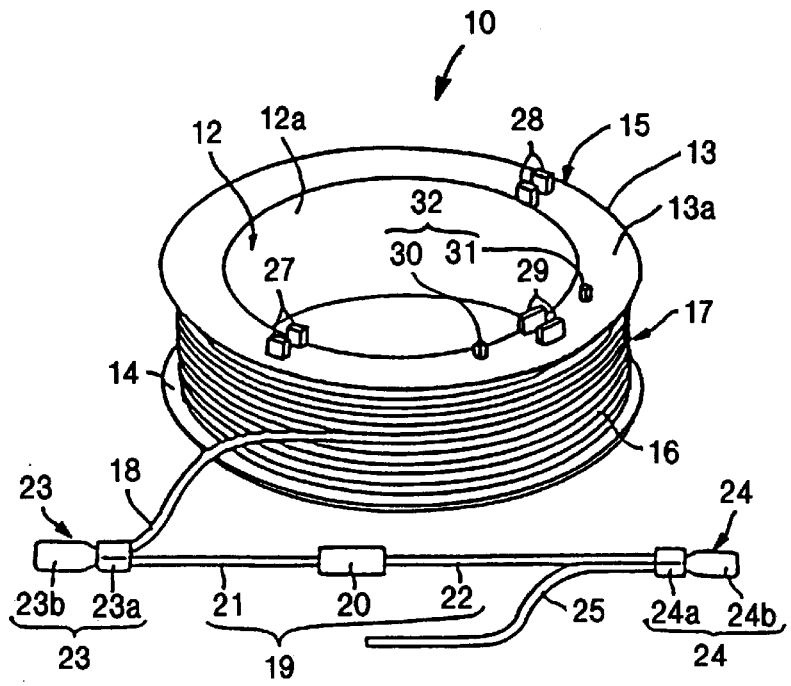
FIG. 3 is a perspective view of an electromagnetic coil assembly in accordance with the first preferred embodiment.
Figure 4:
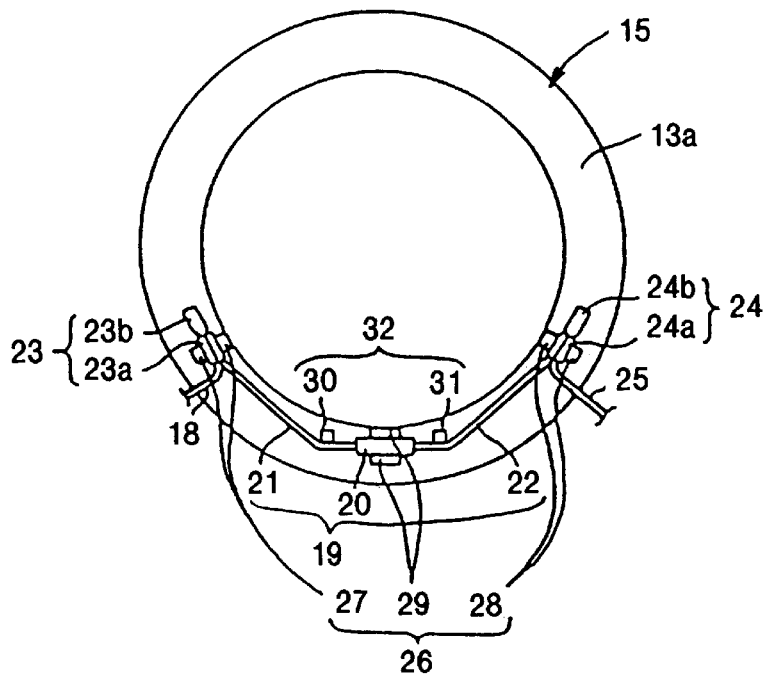
FIG. 4 is a plane view of an electromagnetic coil assembly in accordance with the first preferred embodiment.

Referring to FIGS. 3–5, electromagnetic coil assembly 10 includes coil bobbin 15 and a multiple turn winding 17 therein. Coil bobbin 15 includes a cylindrical tubular spool 12 and a pair of annular flanges 13 and 14 molded integrally with and projecting radially outwardly from tubular spool 12. Coil bobbin 15 is preferably made of a polymer, such as nylon, polyester, polyethylene and polyacetal, or may be made of a polymer composite of inorganic or organic materials. Multiple turn winding 17 includes electric wire 16, which is repeatedly wound on tubular spool 12.

Thermal protection device 19 comprises thermal protector 20 and a pair of lead wires 21 and 22 which extend from both sides of thermal protector 20. Lead wire 21 of thermal protection device 19 is caulked with first end 18 of electric wire 16 by first fitting member 23. Lead wire 22 of thermal protection device 19 is caulked with lead wire 25, which is joined to an external electrical circuit (not shown), by second fitting member 24. Alternatively, lead wires 21 and 22 may be brazed to first end 18 of electric wire 16 and lead wire 25. The second end (not shown) of electric wire 16 is connected with an external electrical circuit (not shown). First and second fitting members 23, 24 include connecting portions 23a, 24a, and preferably include longitudinal tube portions 23b, 24b extending from connecting portions 23a, 24a.

Outboard surface 13a of flange 13 includes connecting mechanism 26 and guiding mechanism 32 for connecting and guiding thermal protection device 19. Connecting mechanism 26 comprises a pair of first projections 27, a pair of second projections 28 and a pair of third projections 29, which are integrally molded as rectangular parallel guides perpendicularly extending from outboard surface 13a. One of each of the pair of first projection 27, second projection 28 and third projection 29 axially extend along inner circumferential surface 12a of spool 12. Thermal protector 20 and fitting members 23, 24 are respectively inserted between pairs of projections 27, 28, 29.

Guiding mechanism 32 includes first and second guiding portions 30, 31, which are integrally formed on and perpendicularly extending from outboard surface 13a of flange 13. First and second guiding portions 30, 31 prevent leads 21, 22 from protruding inside of spool 12.

In assembly, coil assembly 10 is inserted into the inner hollow portion of housing 221, which is U-shaped in cross section, so that surface 13a of flange 13 faces toward the opening of housing 221. Thereafter, the gaps between coil assembly 10 and housing 221 are filled with heated epoxy resin 11, which hardens as it cools.

Thus, when electromagnetic coil 17 is energized, armature plate 226 is magnetically attracted to axial end plate 253 of clutch rotor 215. Armature plate 226 moves rearwardly along axis X—X so that frictional surface 226a engages frictional surface 253a. This engagement transmits the rotation of clutch rotor 215 through leaf springs 227 and hub 224 to drive shaft 213.

Clutch rotor 215 and armature plate 226 slip, which generates heat, since armature plate 226 does not perfectly attract clutch rotor 215. Thermal protection device 19 is responsive to abnormal temperature increases and turns off a circuit controlling the power source to prevent compressor failure.

According to the first preferred embodiment, thermal protection device 19 is inserted into fitting members 23, 24. The effort and precision of assembling thermal protection device 19 is improved over the prior art, without affecting its responsiveness. Moreover, guiding portions 30, 31 prevent leads 21, 22 from snapping, bending, loosening or otherwise interfering with spool 12.

Figure 5A:
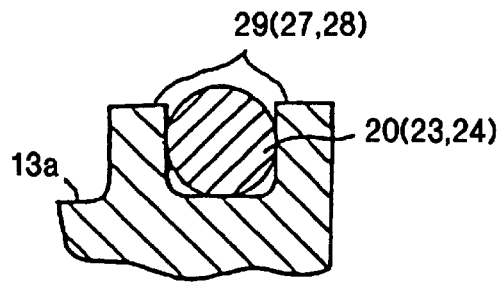
FIGS. 5a–5d are enlarged cross sectional views of several variations of projection portions in accordance with the first preferred embodiment.
Figure 5B:
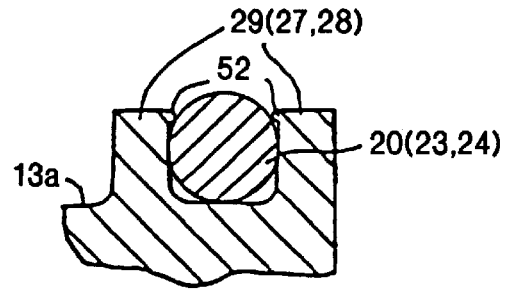
Figure 5C:
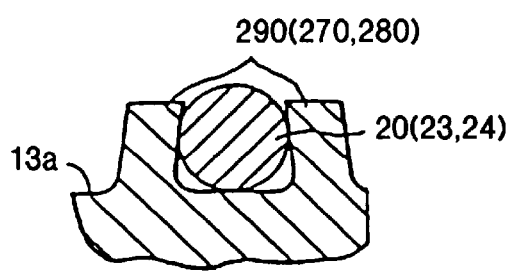
Figure 5D:
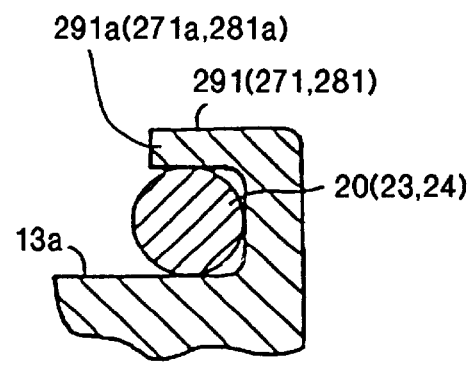

FIG. 5a shows the basic embodiment in which a pair of projections 29 (27, 28) extend from surface 13a to securely hold thermal protector 20 or fitting members 23, 24. FIG. 5b shows a pair of projections 29 (27, 28) may include a pair of small projection portions 52 extending from the extreme end of projections 29 (27, 28). FIG. 5c shows a pair of projections 290 (270, 280), which have a gap therebetween, formed so that the width of the gap gradually decreases with distance from surface 13a. FIG. 5d shows projection 291 (271, 281), which is hook-shaped to hold thermal protection device 19 with arm portion 291a (271a, 281a). In each of the foregoing embodiments, thermal protection device 19 is securely held by connecting mechanism 26.

Figure 6:
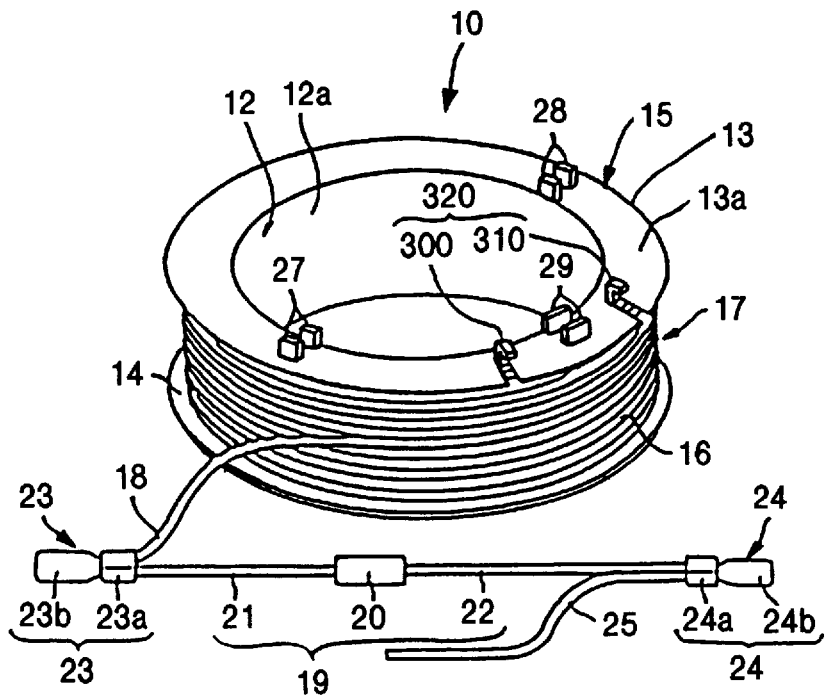
FIG. 6 is a perspective view of an electromagnetic coil assembly in accordance with a second preferred embodiment.
Figure 7:
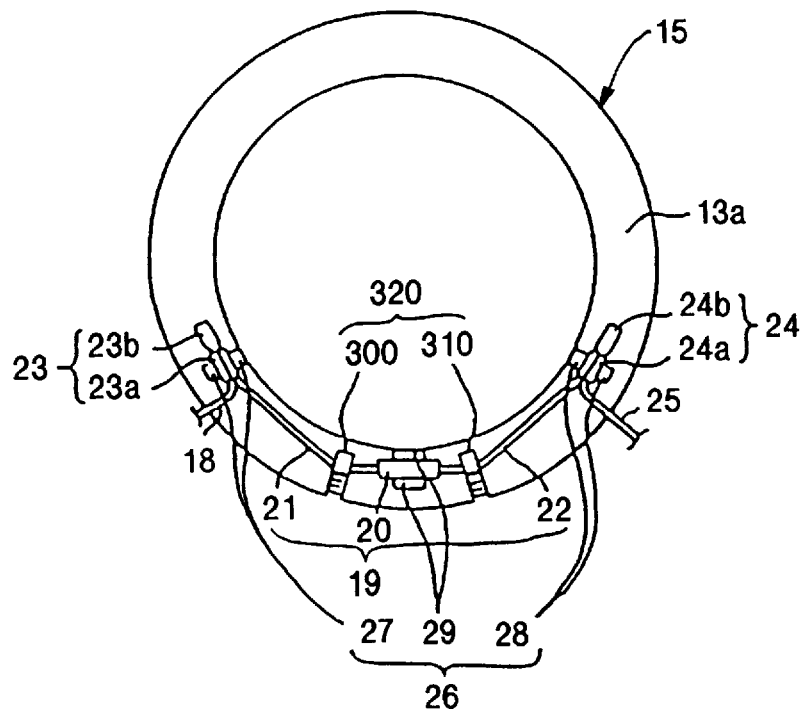
FIG. 7 is a plane view of an electromagnetic coil assembly in accordance with the second preferred embodiment.

FIGS. 6 and 7 illustrate a second preferred embodiment. Elements in FIGS. 6–7 similar to those in FIGS. 3–4 are designated with the same reference numerals. Outboard surface 13a of flange 13 includes connecting mechanism 26 and guiding mechanism 320 for connecting and guiding thermal protection device 19.

Guiding mechanism 320 includes first and second guiding portions 300, 310, which are integrally formed on and perpendicularly extend from outboard surface 13a of flange 13. Third projection 29 is positioned between first and second guiding portions 300, 310. Guiding portions 300, 310 are hook-shaped and prevent leads 21, 22 from protruding into the inner hollow portion of spool 12.

Figure 8:
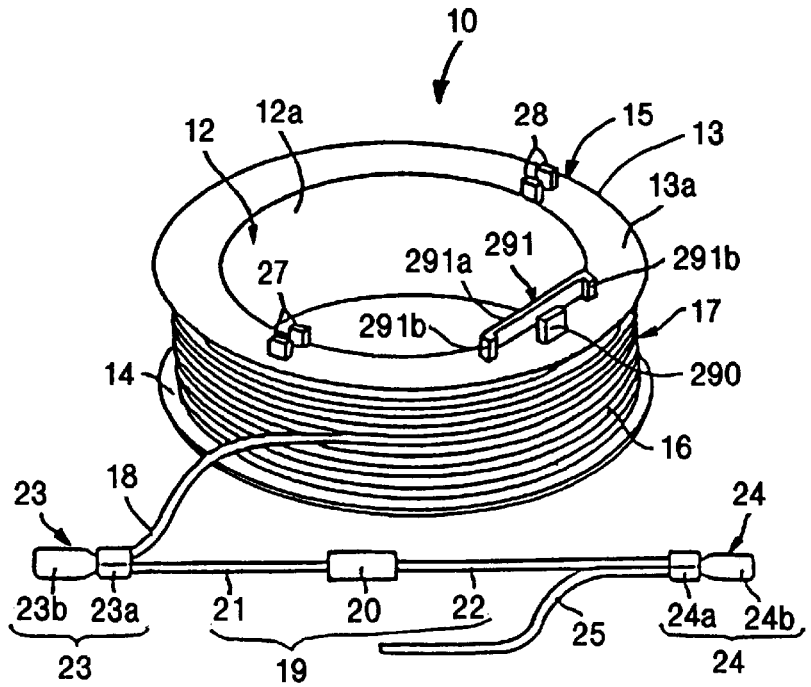
FIG. 8 is a perspective view of an electromagnetic coil assembly in accordance with a third preferred embodiment.
Figure 9:
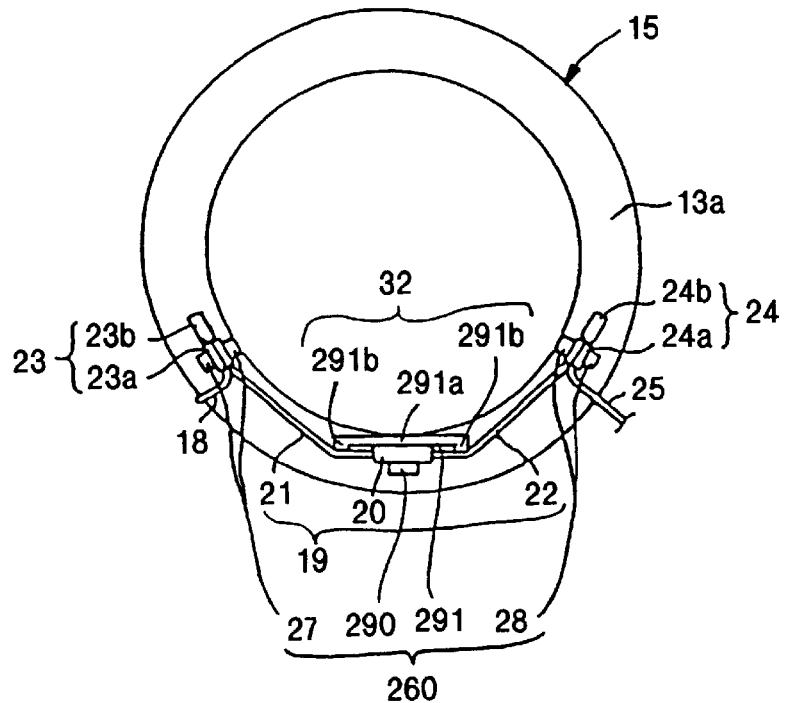
FIG. 9 is a plane view of an electromagnetic coil assembly in accordance with the third preferred embodiment.

FIGS. 8 and 9 illustrate a third preferred embodiment. Elements in FIG. 8 similar to those in FIG. 4 are designated with the same reference numerals. Outboard surface 13a of flange 13 includes connecting mechanism 260 and guiding mechanism 32 for connecting and guiding thermal protection device 19 thereon. Connecting mechanism 260 comprises a pair of first projections 27, a pair of second projections 28, a third projection 290 and a fourth projection 291, all of which are integrally molded thereon. Third projection 290 is rectangularly shaped and axially extends from outboard surface 13a of flange 13. Fourth projection 291 is substantially parallel to third projection 290, and includes first portion 291a and a pair of second portions 291b extending from both ends of first portion 291a. A pair of second portions 291b prevent leads 21, 22 from protruding into the inner hollow portion of spool 12.

Figure 10:
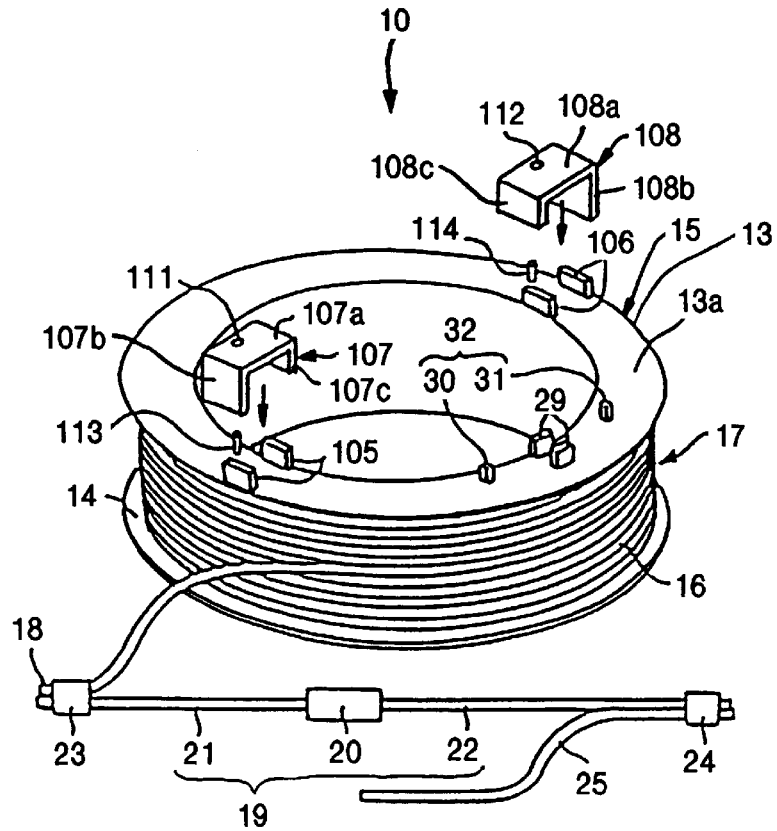
FIG. 10 is a perspective view of an electromagnetic coil assembly in accordance with a fourth preferred embodiment.
Figure 11:
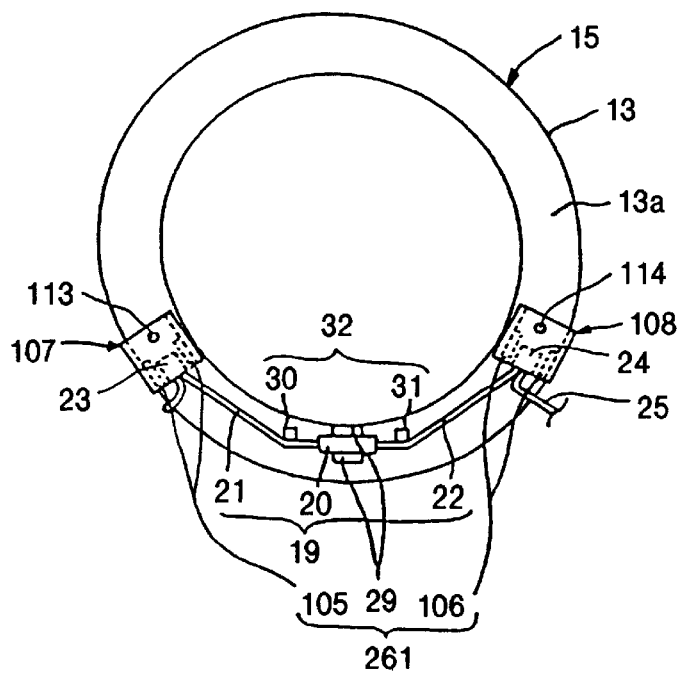
FIG. 11 is a plane view of an electromagnetic coil assembly in accordance with the fourth preferred embodiment.
Figure 12A:
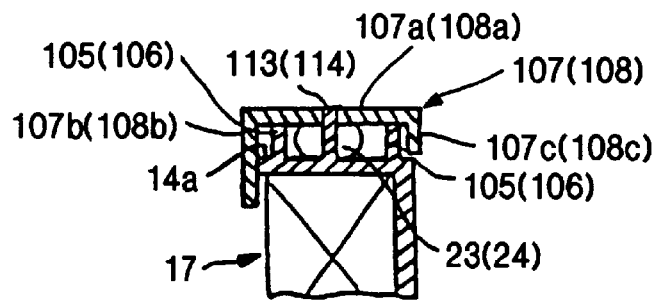
FIGS. 12a–12b are enlarged cross sectional views of connecting devices in accordance with the fourth preferred embodiment of the present invention.

FIGS. 10, 11 and 12a illustrate a third preferred embodiment. Elements in FIG. 10 similar to those in FIG. 4 are designated with the same reference numerals. Outboard surface 13a of flange 13 includes connecting mechanism 261 and guiding mechanism 32 for connecting and guiding thermal protection device 19. Connecting mechanism 261 comprises a pair of first projections 105, a pair of second projections 106 and a pair of third projections 29, which are rectangularly shaped and perpendicularly extend from outboard surface 13a of flange 13 so as to be parallel. Further, connecting mechanism 261 includes first and second supporting projections 113, 114 formed adjacent to first and second projections 105, 106, and perpendicularly extending from outboard surface 13a of flange 13.

Connecting mechanism 261 further includes first and second cap members 107, 108 for covering and securing first and second fitting members 23, 24 to outboard surface 13a of flange 13. Cap members 107, 108 include first plate portions 107a, 108a, second plate portions 107b, 108b perpendicularly extending from one end of first plate portions 107a, 108a, and third plate portions 107c, 108c perpendicularly extending from the other end of first plate portions 107a, 108a. Furthermore, cap members 107, 108 respectively include openings 111, 112 formed on the center of first plate portions 107a, 108a. First and second supporting projections 113, 114 are inserted into openings 111, 112. In this arrangement, first and second fitting members 23, 24 are secured to outboard surface 13a of flange 13 between first and second projections 105, 106 and covered by cap members 107, 108.

Figure 12B:
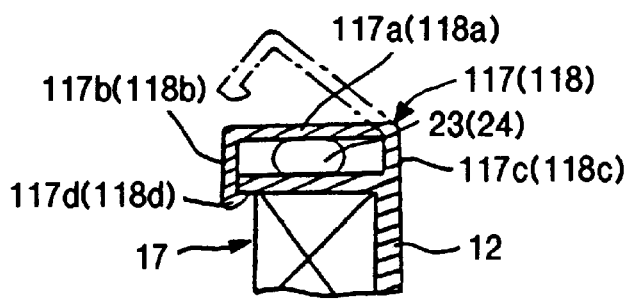

Referring to FIG. 12b, a connecting mechanism 261 according to a further preferred embodiment includes first and second flexible cap members 117, 118 for covering first and second fittings 23, 24. Flexible cap members 117, 118 include first plate portions 117a, 118a, second plate portions 117b, 18b perpendicularly extending from one end of first plate portions 117a and 118a, and third plate portions 117c, 118c perpendicularly extending from spool 12 to the other end of first plate portions 117a, 118a. Furthermore, flexible cap members 117, 118 respectively include hook portions 117d, 118d formed on the extreme end thereof. Hook portions 117d, 118d hold flexible cap members 117, 118 to flange 14 or bobbin 15.

Figure 13:
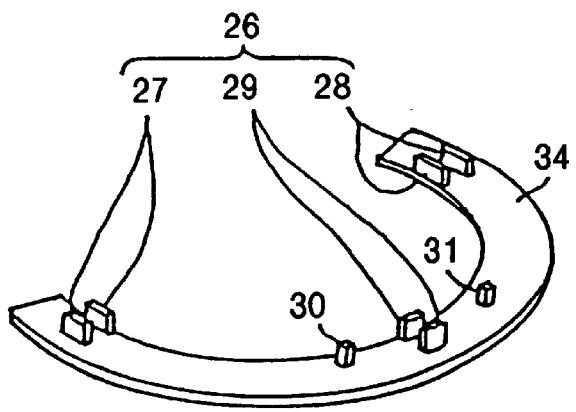
FIG. 13 is a perspective view of the connecting means of an electromagnetic coil assembly in accordance with a fifth preferred embodiment.

As a further alternative embodiment, FIG. 13 depicts connecting mechanism 26 formed on an arc-shaped plate 34. The arc of plate 34 is shaped similar to outboard surface 13a of flange 13. Plate 34 may be secured to outboard surface 13a of flange 13 by adhesive materials. The embodiment of FIG. 13 has substantially the same advantages as those of the preceding embodiments.

Although the present invention has been described in connection with the preferred embodiments, the invention is not limited thereto. It will be easily understood by those of ordinary skill in the art that variations and modifications can easily be made within the scope of this invention as defined by the appended claims.

I claim:

1. An electromagnetic coil assembly for an electromagnetic device comprising:

a bobbin including a cylindrical tubular spool and a pair of annular flanges projecting radially from said spool;

a multiple turn winding of electrical wire supported on said spool between said flanges;

a thermal protection device having a pair of lead wires extending from both sides thereof, said first lead wire connected with one end of said multiple turn winding by a first joining means, said second lead wire connected with an electric circuit by a second joining means; and a connecting mechanism comprising an arc-shaped plate member provided with first and second fitting mechanisms thereon for receiving said first and second joining means, and a third fitting mechanism located between said first and second fitting mechanisms for receiving said thermal protection device, the arch-shaped plate member disposed on an outboard surface of one of said annular flanges for connecting said thermal protection device to said one of said annular flanges, said first joining means and said second joining means secured to said outboard surface of said annular flange of said bobbin.

2. An electromagnetic coil assembly for an electromagnetic device comprising:

a bobbin including a cylindrical tubular spool and a pair of annular flanges projecting radially from said spool;

a multiple turn winding of electrical wire supported on said spool between said flanges;

a thermal protection device having a first and second lead wire extending from opposite sides thereof;

an arc-shaped plate member comprising:
   a first pair of projections for receiving a first fitting member;
   a second pair of projections for receiving a second fitting member;
   a third pair of projections between said first and second pair of projections for receiving said thermal protection device;

wherein the arc-shaped plate member is secured to an outboard surface of one of said annular flanges by an adhesive material.

* * * * *